(No Model.) 2 Sheets—Sheet 1.

H. OGBORN.
SEED SEPARATOR.

No. 269,314. Patented Dec. 19, 1882.

Witnesses,
Richard H. King
Frank C. Doran

Inventor
Harrison Ogborn (No Model.) 2 Sheets—Sheet 2.

H. OGBORN.
SEED SEPARATOR.

No. 269,314. Patented Dec. 19, 1882.

Witnesses
Richard N King
Frank C Doran

Inventor
Harrison Ogborn.

UNITED STATES PATENT OFFICE.

HARRISON OGBORN, OF RICHMOND, ASSIGNOR OF ONE-HALF TO SAMUEL WATSON, OF DUBLIN, INDIANA.

SEED-SEPARATOR.

SPECIFICATION forming part of Letters Patent No. 269,314, dated December 19, 1882.

Application filed September 13, 1882. (No model.)

*To all whom it may concern:*

Be it known that I, HARRISON OGBORN, a citizen of the United States, residing at Richmond, in the county of Wayne and State of Indiana, have invented certain new and useful Improvements in Seed-Separators; and I do hereby declare the following to be a full, clear, and exact description of the invention, such as will enable others skilled in the art to which it appertains to make and use the same.

My invention relates to certain new and useful improvements in seed-separators, having for its object the production of a machine by which the small seed, cockle, chess, and other extraneous substances may be more thoroughly and effectually separated from the wheat; and to this end the invention consists in novel features of construction and combination and arrangement of parts, all as will be hereinafter more fully described, and set forth in the claims hereto annexed.

Figure 1:
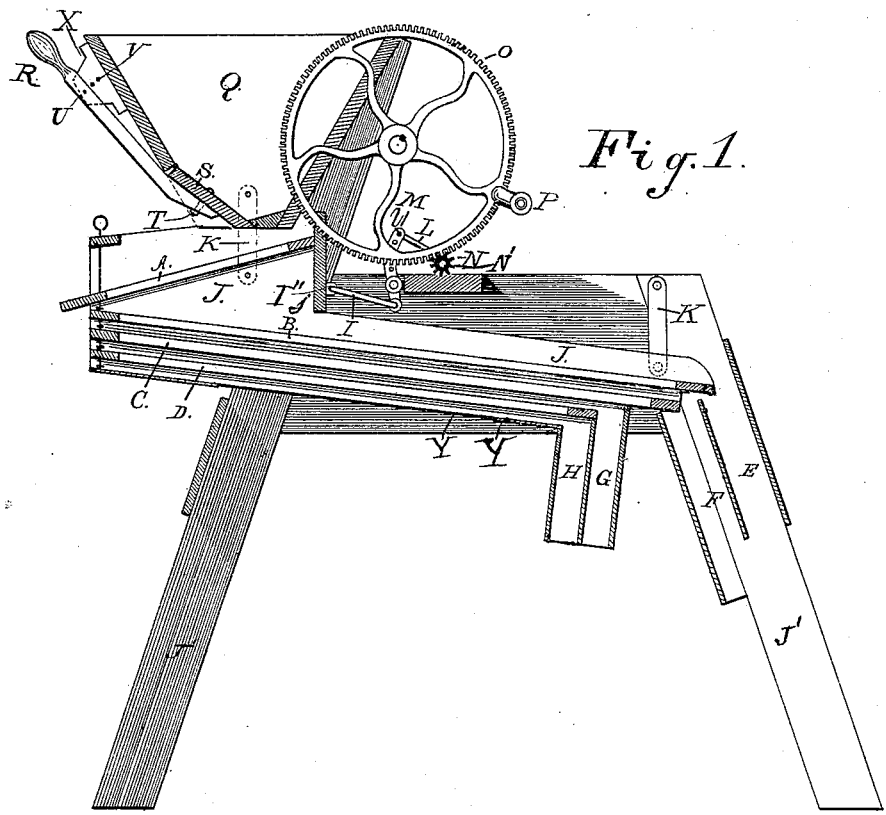
Figure 2:
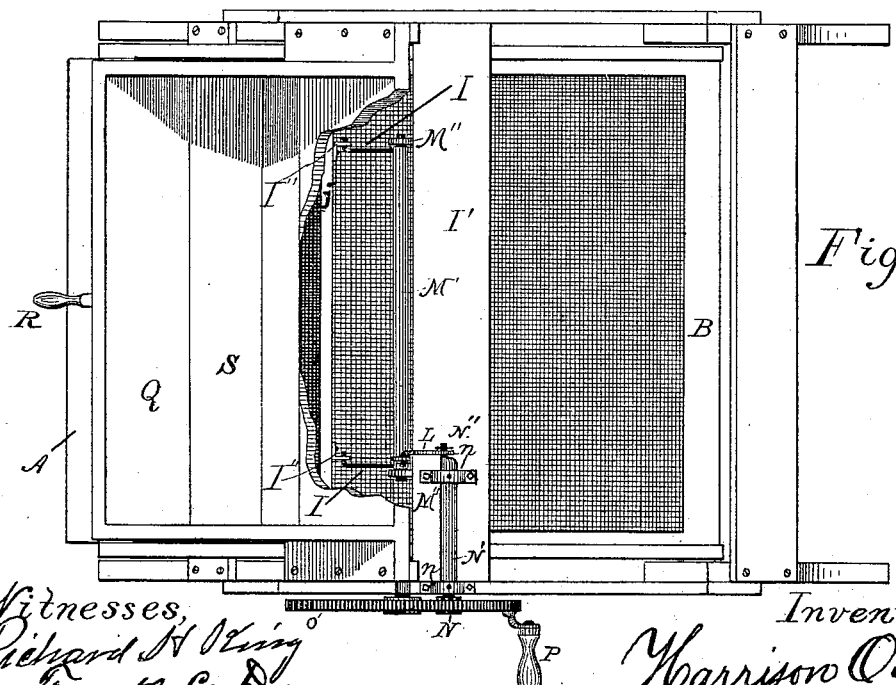
Figure 3:
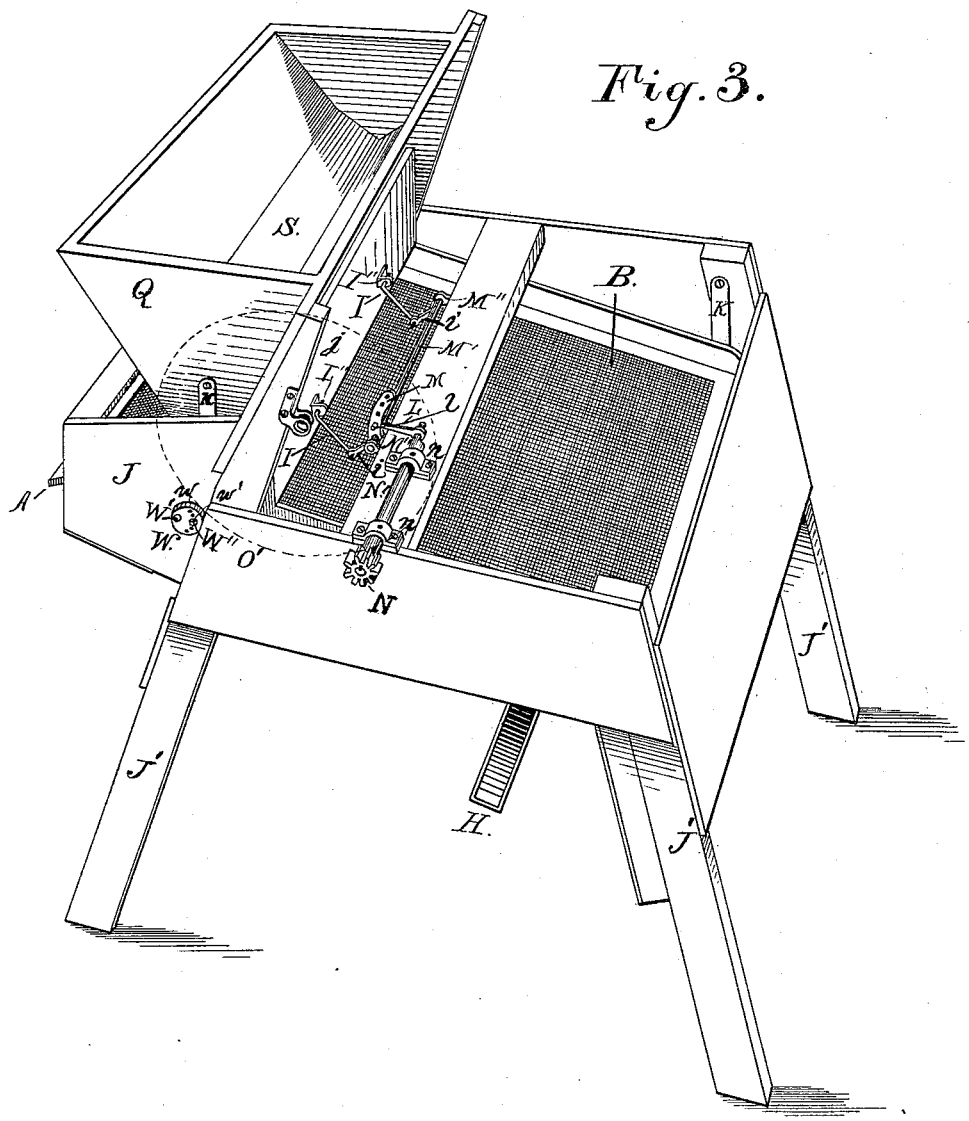

Referring to the accompanying drawings, Figure 1 represents a longitudinal vertical section through my improved machine; Fig. 2, a top view or plan; Fig. 3, a view in perspective.

In the drawings, J' represents the legs for supporting the frame of the machine.

Q represents the grain-receiving hopper, provided with a hinged bottom, S, having a lever, R, pivotally connected at its lower end to the under side of said bottom by a bolt, T, which permits of the lever having a sidewise or lateral movement. This lever R is provided with a small horizontal pin, U, attached thereto on a line with the holes V in block X, all as clearly shown in Fig. 1. By pulling this lever R to the right the pin V will be drawn out of one of the holes in said block X, thus disengaging said lever, so that it may be operated to throw the hinged bottom entirely open or to any extent desired, to regulate the flow of grain from the hopper, and secured in any desired position by moving the lever R sidewise or laterally, so that the pin U may be pushed into any one of the holes on a line therewith in the block X.

J represents the inclined vibrating shoe, constructed as shown, with the forward end thereof extending up under and beyond the hinged bottom S of the hopper. This shoe is suspended from the sides of the hopper and sides of the frame, near its rear end, by the usual pivoted links, K, and is operated through the medium of the following mechanism: A large gear-wheel, O, having an operating-handle, P, meshes with a pinion, N, mounted on the outer end of a shaft, N', journaled in bearings $n\ n$, secured to the cross-bar I' of the frame of the machine. The shaft N' has a crank-pin, N'', connected to its inner end, to which is secured one end of an arm or rod, L, which has its other end provided with a hook, $l$, adapted to engage one of a series of holes in the upper end of an upright pivoted lever, M, by which the length of the throw of the vibrating shoe J is regulated, and by means of which a rocking movement is given to shaft M' upon the lower end of the lever M. This rocking shaft has a journal at each end thereof, that passes into, is supported by, and plays in bearings M'' M'', secured to the cross-bar I', and said shaft has an arm, $i$, projecting downward near each end, and provided with holes for the reception of the bent ends of rods I I, which are connected at their other ends to the part $j$ of the shoe J by eyebolts 1'' 1'', or in any other suitable manner.

By the above-described mechanism the shoe J, with its screens, is given a short, solid, definite, and firm shaking or vibrating movement, due to the two attachments of the shaking-rods to the shoe, and arranged so far apart as to impart a rigid shaking movement to all parts of the shoe alike.

In addition to the advantages before described, I attach to each side of the shoe a jarring-eccentric, W, (only one of which is shown in the drawings,) which eccentrics have raised rims $w\ w$ partially around them, to form broad surfaces that engage or strike the legs J' J', giving a quick percussive movement to the shoe, that assists in the separation of the grain from other particles. The eccentrics are pivotally connected to the shoe by bolts W', and have a series of adjusting-holes, W'', through which a pin or bolt, $w'$, passes into the shoe, thus permitting of the adjustment of said eccentrics to increase or decrease the percussion movement imparted to the shoe in its vibrations, and also in accordance with the length of throw given to the vibrating shoe.

The shoe J is provided with a screen, A, arranged in the forward and upper end thereof, under the hopper Q, and inclining downward toward the head of the shoe, and upon which the grain from the hopper falls near its upper end. This screen is made of wire-cloth sufficiently fine to prevent large particles or extraneous matter from passing through it, and which matter is carried over the end thereof, while permitting the grain to pass through readily onto the upper end of screen B, inclining in an opposite direction, and which, being of proper mesh, retains the best or seed wheat, which passes along over it, and is discharged from the machine through the spout E into a suitable receptacle. The small grains of wheat, chess, cockle, and sand, and other small extraneous particles are separated from the large grains of wheat and fall through the screen B onto an inclined screen, C, of still finer mesh, where the small wheat is separated and is carried over the end thereof into discharge-spout F, while the smaller seed and particles pass through it onto a screen, D, of still finer mesh, which permits of the timothy passing through it, while the chess and cockle pass down over it into discharge-spout G, the timothy falling onto the solid bottom Y, whence it passes into discharge-spout H.

My improved machine is simple in construction and effective in operation, thoroughly separating the wheat into different grades, as well as separating the small seeds therefrom and from each other.

Further description of the operation of the machine is deemed unnecessary, it being obvious from the foregoing.

Having thus fully described my invention, what I claim as new, and desire to secure by Letters Patent, is—

1. In a seed-separator, the combination, with the hopper having a hinged bottom, S, of the lever R, pivotally connected at its lower end to said bottom and adapted to be moved sidewise or laterally, and provided with a horizontal pin and a block connected to the outer and front side of hopper, and having a series of holes, into which the pin of the lever may pass when said lever is adjusted, substantially in the manner as and for the purpose specified.

2. In a seed-separator, the combination, with shoe J, rods I I, arms $ii$, rocking shaft M′, gear-wheel O, and pinion N, of the intermediate mechanism for connecting said shaft M′ and pinion N, consisting of revolving shaft N′, (upon which said pinion is mounted,) having crank-pin N″, arm or rod L, and upright lever M, mounted upon said rocking shaft, substantially in the manner as and for the purpose herein shown and described.

3. In a seed-separator, the combination, with shoe J, rods I I, arms $ii$, rocking shaft M′, gear-wheel O, and pinion N, of the intermediate mechanism for connecting said shaft M′ and pinion N, consisting of revolving shaft N′, (upon which said pinion is mounted,) having crank-pin N″, arm or rod L, and upright lever M, having a series of adjusting-holes and mounted upon said rocking shaft, substantially in the manner as and for the purpose herein shown and described.

4. A seed-separator comprising the hopper Q, having hinged bottom S, the shoe J, provided with a series of screens, A B C D, discharge-spouts E F G H, gear-wheel O, intermediate operating mechanism, substantially as described, for connecting said shoe and wheel, pivoted and rotary adjustable eccentrics W W, and legs J′ J′, the several parts constructed and arranged to operate substantially in the manner herein shown and described.

In testimony whereof I affix my signature in presence of two witnesses.

HARRISON OGBORN.

Witnesses:
JAMES W. HENDERSON,
WILLIAM H. OGBORN.